(12) United States Patent
Ayrignac et al.

(10) Patent No.: US 10,175,989 B2
(45) Date of Patent: Jan. 8, 2019

(54) VLIW TYPE INSTRUCTION PACKET STRUCTURE AND PROCESSOR SUITABLE FOR PROCESSING SUCH AN INSTRUCTION PACKET

(71) Applicant: KALRAY, Orsay (FR)

(72) Inventors: Renaud Ayrignac, Orsay (FR); Vincent Ray, Orsay (FR); Benoît Dupont De Dinechin, Grenoble (FR)

(73) Assignee: KALRAY, Orsay (FR)

( * ) Notice: Subject to any disclaimer, the term of this patent is extended or adjusted under 35 U.S.C. 154(b) by 233 days.

(21) Appl. No.: 15/312,961

(22) PCT Filed: Apr. 27, 2015

(86) PCT No.: PCT/FR2015/051134
§ 371 (c)(1),
(2) Date: Nov. 21, 2016

(87) PCT Pub. No.: WO2015/177427
PCT Pub. Date: Nov. 26, 2015

(65) Prior Publication Data
US 2017/0192792 A1    Jul. 6, 2017

(30) Foreign Application Priority Data
May 22, 2014 (FR) ..................... 14 54638

(51) Int. Cl.
*G06F 8/41* (2018.01)
*G06F 9/30* (2018.01)
*G06F 9/38* (2018.01)

(52) U.S. Cl.
CPC ............ *G06F 9/3853* (2013.01); *G06F 8/445* (2013.01); *G06F 9/30149* (2013.01); *G06F 9/3855* (2013.01); *G06F 9/3885* (2013.01)

(58) Field of Classification Search
CPC .. G06F 8/445; G06F 9/30149; G06F 9/30152; G06F 9/3822; G06F 9/3853; G06F 9/3885
See application file for complete search history.

(56) References Cited

U.S. PATENT DOCUMENTS 6,324,639 B1    11/2001    Heishi et al.

FOREIGN PATENT DOCUMENTS

| DE | 10301323 A1 | 8/2004 |
|---|---|---|
| WO | 2004/017197 A2 | 2/2004 |

OTHER PUBLICATIONS

Heidi Pan and Krste Asanovic., "Heads and Tails: A Variable-Length Instruction Format Supporting Parallel Fetch and Decode", 2001, ACM. (Year: 2001).*

(Continued)

*Primary Examiner* — Benjamin P Geib
(74) *Attorney, Agent, or Firm* — Oliff PLC (57) ABSTRACT

A processor including multiple processing units for processing multiple elementary instructions in parallel, the elementary instructions including one or more syllables, each having a rank in the elementary instruction, and an input circuit configured to receive an instruction bundle including multiple elementary instructions, and to transmit to the processing units all syllables of first rank of the elementary instructions of the instruction bundle before syllables of second rank of the elementary instructions of the instruction bundle, the syllables of same rank being ordered according to the target processing unit of each syllable.

15 Claims, 6 Drawing Sheets

(56) References Cited

OTHER PUBLICATIONS

Lin et al., "An Efficient VLIW DSP Architecture for Baseband Processing", 2003, IEEE. (Year: 2003).*
Jul. 23, 2015 International Preliminary Report on Patentability issued in Internation Patent Application No. PCT/FR2015/051134.
Jul. 23, 2015 International Search Report issued in International Patent Application No. PCT/FR2015/051134.

* cited by examiner

| Pj[i] | IT | RNG | PUC | EW |

VLIW TYPE INSTRUCTION PACKET STRUCTURE AND PROCESSOR SUITABLE FOR PROCESSING SUCH AN INSTRUCTION PACKET

FIELD

The present invention relates to Very Long Instruction Word (VLIW) processors, and especially to variable length instruction bundle processors.

BACKGROUND

Such processors include a CPU having multiple processing units for executing multiple instructions in parallel. VLIW instruction bundles may include multiple elementary instructions targeting the different processing units of the CPU. Thus an instruction bundle for such a processor may reach a length typically between 64 and 128 bits, or even 256 bits or more.

Figure 1:
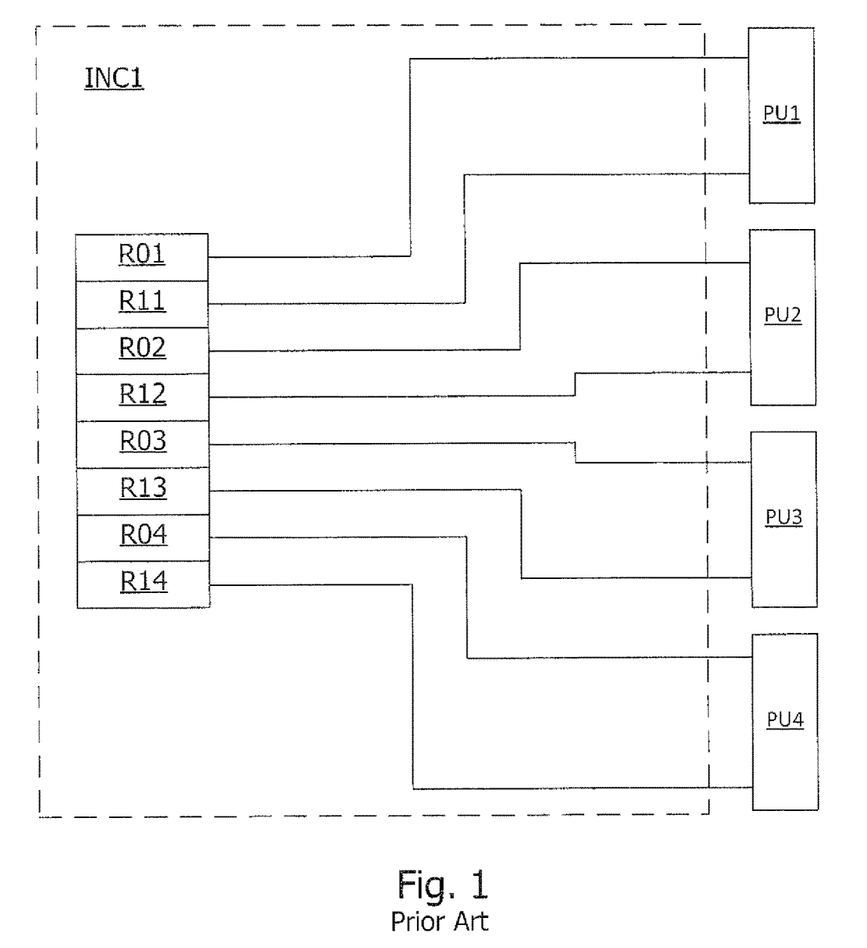
FIGS. 1-4 described above schematically show processing units of a VLIW processor, and their input circuitry, according to various solutions of the prior art.

In some VLIW processors, the distribution of elementary instructions of an instruction bundle between the CPU processing units is always performed in the same order. FIG. 1 shows an input circuit INC1 of processing units PU1, PU2, PU3, PU4 of such a processor. The circuit INC1 includes registers R01-R04 and R11-R14 designed for receiving elementary instructions of an instruction bundle. The registers R0j, R1j are connected to the processing unit PUj, where j=1, 2, 3 and 4. VLIW instruction bundles are then divided into lanes, each lane being assigned to a processing unit PUj. The compiler is then configured to assign to a particular lane in each instruction bundle it generates, only elementary instructions that can be processed by the processing unit corresponding to that lane. The instruction bundles generated by the compiler then systematically present the following structure: P1-P2-P3-P4, Pj being an elementary instruction exclusively executable by the processing unit PUj (j=1, 2, 3, or 4). If the program to be executed by the processor includes consecutive elementary instructions requiring a same processing unit, it may be necessary to allocate these elementary instructions to different VLIW instruction bundles. If the other lanes of these bundles cannot receive elementary instructions requiring other processing units, these lanes usually receive elementary NOP instructions that do not trigger any processing. Moreover, in the case of elementary instructions of variable size, the compiler completes the lanes receiving elementary instructions smaller than the maximum size with one or more elementary NOP instructions. The term "syllable" designates a fixed-size word that composes an elementary instruction of variable size. In the example of FIG. 1, the elementary instructions include one or two syllables of same size. Thus the registers R01-R04 are configured for receiving the first syllable of the elementary instructions of an instruction bundle, and the registers R11-R14 are configured for receiving the possible second syllable of the elementary instructions. For each elementary instruction having no second syllable, the register R1j paired with the register R0j receiving the first syllable of the elementary instruction is padded with a single syllable NOP instruction.

It follows that a substantial portion of the memory containing the program may be occupied by NOP instructions. It also follows that a substantial portion of the data flow on the processor instruction bus contains such instruction bundles. These drawbacks lead to poor use of CPU processing resources, and power consumption. It also follows that a significant portion of the program memory is occupied unnecessarily by NOP instructions.

Figure 2:
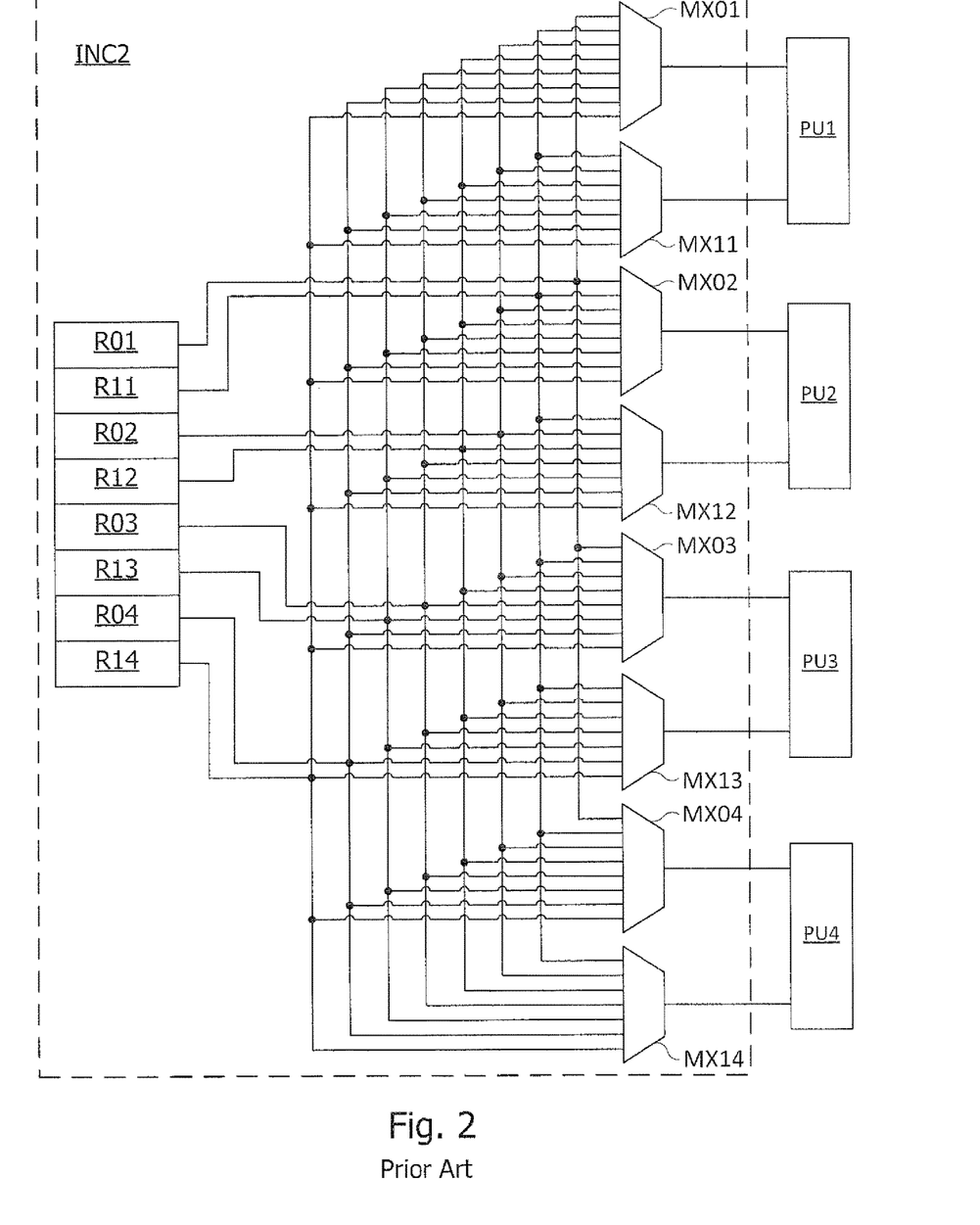

Some processors are designed to not constrain allocations of VLIW bundle instructions to processing units. With such a configuration, it is not necessary to insert NOP instructions in the instruction bundles. To this end, each instruction input of each processing unit comprises a multiplexer whose inputs are connected to input registers receiving the elementary instructions of the VLIW bundle. FIG. 2 shows an input circuit INC2 of processing units PU1-PU4, in the case where the elementary instructions in the VLIW instruction bundles have up to two syllables. The input circuit INC2 includes registers R01-R04 and R11-R14, and two multiplexers MX01-MX04 and MX11-MX14 for each processing unit PU1-PU4. The VLIW bundles generated by the compiler of such a processor include at most four elementary instructions, each having one or two syllables of same size. Each first multiplexer MX01-04 provides the first syllable of an elementary instruction to a processing unit PU1-PU4 to which it is connected, and each second multiplexer MX11-MX14 provides the second syllable of an elementary instruction to the processing unit PU1-PU4 to which it is connected. Since the register R01 cannot receive a second elementary instruction syllable, it is only connected to the first multiplexers MX01-MX04. Therefore, each first multiplexer MX01-MX04 has eight inputs, and each second multiplexer MX11-MX14 has seven inputs, for four processing units PU1-PU4. The multiplexers MX01-MX04 and MX11-MX14 may therefore be controlled by three-bit control words. This results in an interconnection circuitry between the registers R01-R04 and R11-R14 and multiplexers MX01-MX04 and MX14-M11, and a multiplexer control circuit having a relatively high complexity (60 multiplexer inputs). In addition, the propagation time of a signal in a multiplexer increases with the number of inputs of the multiplexer. The presence of the multiplexers MX01 to MX04 in particular, may require processing of the instruction bundle to be delayed by a clock cycle.

It is possible to significantly reduce the number of multiplexer inputs by ordering the elementary instructions in the VLIW instruction bundle according to ranks assigned to the processing units and by completing the shorter elementary instructions (shorter than the maximum number of syllables) with NOP instructions, so that all the elementary instructions in the instruction bundle, eventually completed, have the same length, i.e. the same number of syllables.

Figure 3:
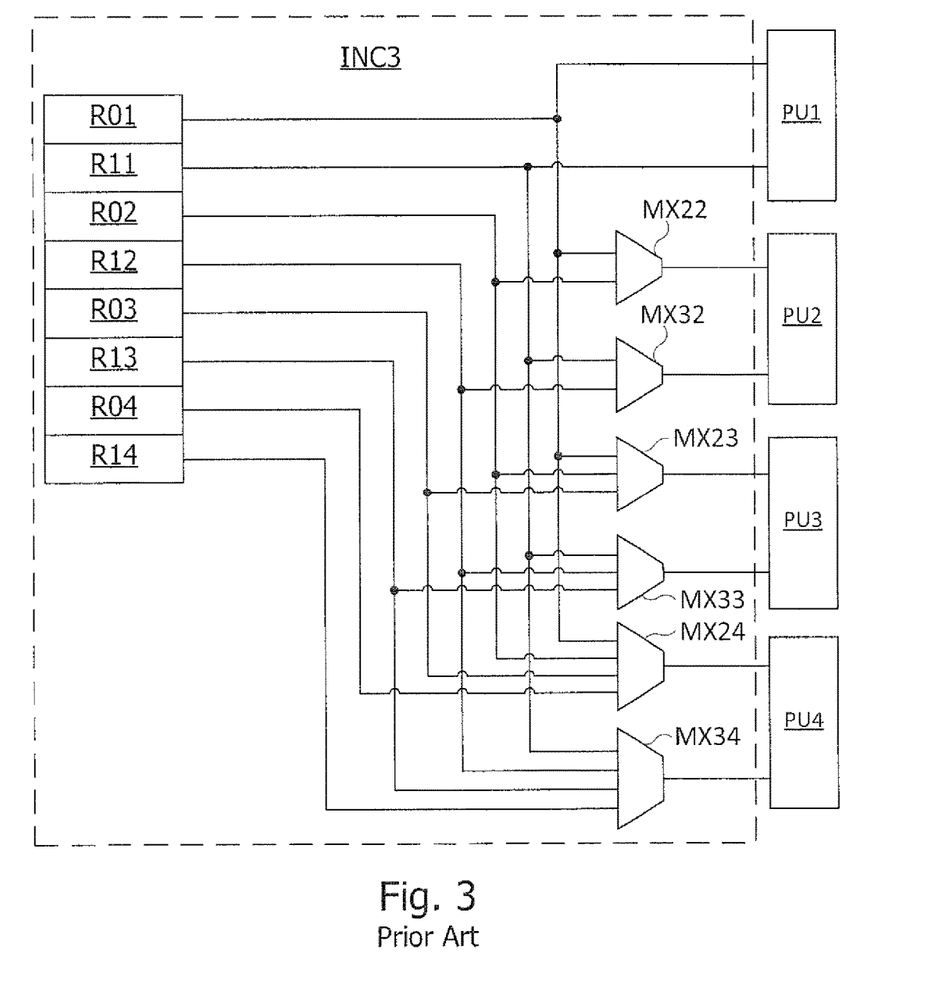

Thus, FIG. 3 shows an input circuit INC3 of processing units PU1-PU4. The input circuit INC3 includes registers R01-R04 and R11-R14, and multiplexers MX22-MX24 and MX32-MX34. The registers R01 and R11 are connected directly to the first and second inputs of the processing unit PU1. The multiplexer MX22 is connected by its inputs to the registers R01 and R02, and by its output to the first input of the processing unit PU2. The multiplexer MX32 is connected by its inputs to the registers R11 and R12, and by its output to the second input of the processing unit PU2. The multiplexer MX23 is connected by its inputs to the registers R01, R02 and R03, and by its output to the first input of the processing unit PU3. The multiplexer MX33 is connected by its inputs to the registers R11, R12 and R13, and by its output to the second input of the processing unit PU3. The multiplexer MX24 is connected by its inputs to registers R01-R04 and by its output to the first input of the processing unit PU4. The multiplexer MX34 is connected by its inputs to registers R11-R14, and by its output to the second input of the processing unit PU4. This solution limits to 18 the number of inputs of the multiplexers MX22-MX24, MX32-

MX34. However, this solution only partially contributes to improving the use of processor resources and the use of program memory, since NOP instructions are still added in the instruction bundle to the elementary instructions not having the maximum number of syllables.

Figure 4:
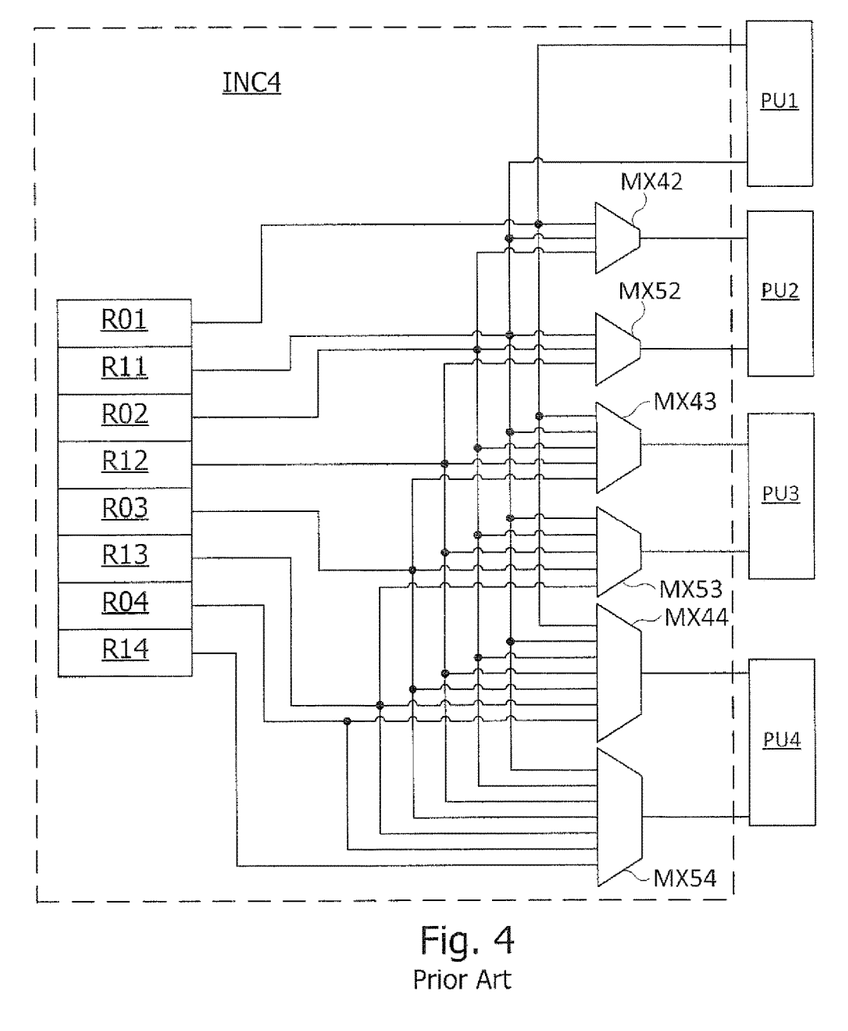

The need to insert NOP instructions in the VLIW instruction bundles can be avoided by maintaining an order of elementary instructions in the instruction bundle, corresponding to the order assigned to the processing units. Thus, FIG. 4 shows an input circuit INC4 of processing units PU1-PU4. The input circuit INC4 includes registers R01-R04 and R11-R14, and multiplexers MX42-MX44 and MX52-MX54. The registers R01 and R11 are connected directly to the first and second inputs of the processing unit PU1. The multiplexer MX42 is connected by its inputs to the registers R02, R11 and R02, and by its output to the first input of the processing unit PU2. The multiplexer MX52 is connected by its inputs to the registers R11, R02 and R12, and by its output to the second input of the processing unit PU2. The multiplexer MX43 is connected by its inputs to the registers R01, R11, R02, R12 and R03, and by its output to the first input of the processing unit PU3. The multiplexer MX53 is connected by its inputs to the registers R11, R02, R12, R03 and R13, and by its output to the second input of the processing unit PU3. The multiplexer MX44 is connected by its inputs to the registers R01-R04 and R11-R13, and by its output to the first input of the processing unit PU4. The multiplexer MX54 is connected by its inputs to the registers R02-R04 and R11-R14, and by its output to the second input of the processing unit PU4. This solution limits to 30 the number of inputs of the multiplexers MX42-MX44, MX52-MX54, without having to insert NOP instructions in the VLIW instruction bundles. However, this solution also requires multiplexers with a large number of inputs. In particular, the multiplexer MX44 may need the processing of instruction bundles to delayed by one clock cycle.

It is desirable to simplify the input circuit of the processing units of a VLIW processor without penalizing the use of CPU processing resources and the use of program memory, and without increasing power consumption. It is also desirable to improve the efficiency of this input circuit for transmitting the elementary instructions of an instruction bundle to the various processing units.

SUMMARY

Embodiments relate to a compiling method of a program for a processor having multiple processing units capable of executing instruction bundles having several elementary instructions, the method comprising steps of gathering in an instruction bundle multiple elementary instructions each targeting a respective processing unit of the processor, each elementary instruction including one or more syllables each having a rank in the elementary instruction, and distributing the syllables of the elementary instructions in the instruction bundle by groups of syllables of same rank, a group of syllables of first rank of all elementary instructions of the instruction bundle being inserted in the instruction bundle before a group of syllables of second rank of all the elementary instructions of the instruction bundle, the syllables in each group being ordered according to the target processing unit of each syllable.

In an embodiment, the syllables of same rank are ordered in the instruction bundle so that a high priority processing unit receives first its respective elementary instruction syllable.

In an embodiment, each syllable of each instruction bundle includes an end code indicating whether the syllable is the last in the instruction bundle.

In an embodiment, each syllable of each instruction bundle includes a processing unit code indicating the processing unit to which the syllable is to be transmitted.

In an embodiment, each syllable of each instruction bundle includes a code indicating the rank of the syllable.

In an embodiment, each instruction bundle includes less syllables than the number of processing units times the maximum number of syllables per elementary instruction.

In an embodiment, the syllables of all elementary instructions have the same length.

Embodiments also relate to a processor comprising multiple processing units for processing multiple elementary instructions in parallel, the elementary instructions including one or more syllables, each having a rank in the elementary instruction, and an input circuit configured to receive an instruction bundle including multiple elementary instructions, and to transmit to the processing units all syllables of first rank of the elementary instructions of the instruction bundle faster than syllables of second rank of the elementary instructions of the instruction bundle, the syllables of same rank being ordered according to the target processing unit of each syllable.

In an embodiment, the syllables of the instruction bundle are distributed in groups of syllables of same rank, a group of syllables of first rank being placed at the beginning of the instruction bundle, wherein the syllables in each group are ordered in an order assigned to the processing units.

In an embodiment, the input circuit is configured to transmit to the processing units the syllables of each group of the instruction bundle, respecting the order assigned to the processing units.

In an embodiment, the input circuit includes registers configured for receiving each a respective syllable of the instruction bundle, the number of registers being at most equal to the number of processing units of the processor, times a maximum number of syllables per elementary instruction.

In an embodiment, the number of registers is less than the number of processing units of the processor, times a maximum number of syllables per elementary instruction.

In an embodiment, each syllable of each instruction bundle includes an end code indicating whether the syllable is the last in the instruction bundle.

In an embodiment, each syllable of each instruction bundle includes a processing unit code indicating the processing unit to which the syllable is to be transmitted.

In an embodiment, each syllable of each instruction bundle includes a code indicating the rank of the syllable.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

According to an embodiment, VLIW instruction bundles, each comprising one or more elementary instructions, each formed of one or more syllables, are produced by a compiler by ordering the elementary instructions in each VLIW instruction bundle starting with the first syllables of the elementary instructions. Thus, each VLIW instruction bundle includes the syllable of first rank of all the elementary instructions of the bundle, followed by possible syllables of second rank, and so on. The syllables of each rank are ordered according to an order assigned to the processing units. Thus, only the order of the syllables is imposed in a VLIW instruction bundle, but not the strict position of the syllables in the bundle.

Figure 5:
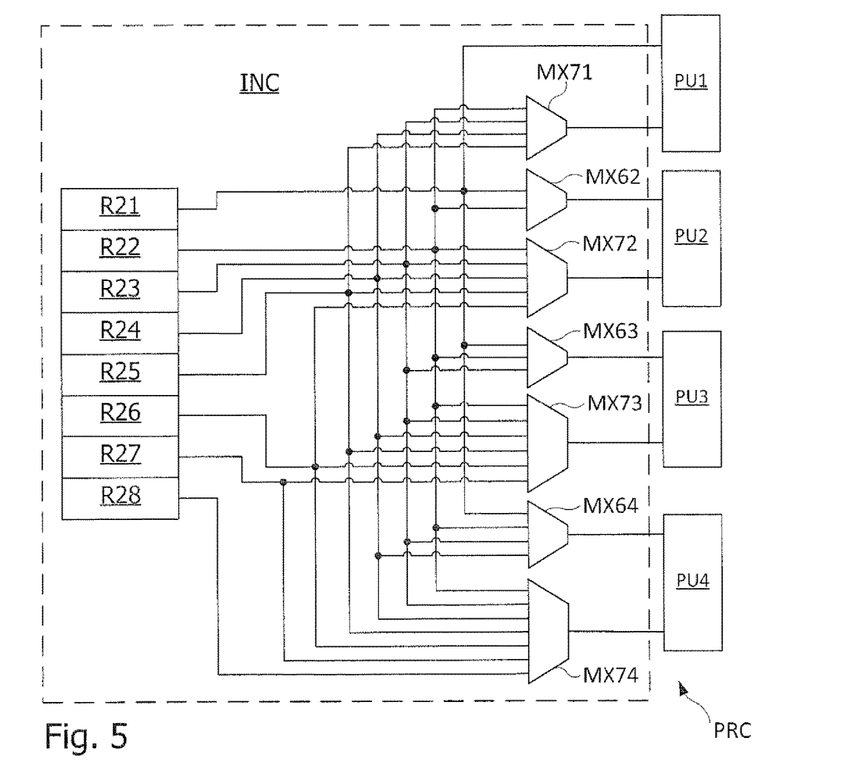
FIG. 5 schematically shows the processing units of a VLIW processor, and their input circuitry, according to an embodiment.

FIG. 5 shows processing units PU1-PU4 of a processor PRC, and an input circuit INC for processing units PU1-PU4, adapted to process such instruction bundles. The input circuit INC includes instruction registers R21 to R28, and multiplexers MX62-MX64 and MX71-MX74 connecting the input registers to the processing units. The registers R21-R28 each receive a respective syllable of the elementary instructions of a VLIW instruction bundle. FIG. 5 illustrates the case of a processor with four processing units, and therefore capable of processing VLIW instruction bundles of up to four elementary instructions.

The register R01 is connected directly to the first input of the processing unit PU1. The multiplexer MX71 is connected by its inputs to registers R22-R25, and by its output to the second input of the processing unit PU1. The multiplexer MX62 is connected by its inputs to the registers R21 and R22, and by its output to the first input of the processing unit PU2. The multiplexer MX72 is connected by its inputs to registers R22-R26, and by its output to the second input of the processing unit PU2. The multiplexer MX63 is connected by its inputs to registers R21-R23, and by its output to the first input of the processing unit PU3. The multiplexer MX73 is connected by its inputs to registers R22-R27, and by its output to the second input of the processing unit PU3. The multiplexer MX64 is connected by its inputs to registers R21-R24, and by its output to the first input of the processing unit PU4. The multiplexer MX74 is connected by its inputs to registers R22-R28, and by its output to the second input of the processing unit PU4.

The number of inputs of the multiplexers MX62-MX64, MX71-MX74 is thus limited to 32, and it is not necessary to insert NOP instructions in the VLIW instruction bundles. In addition, the multiplexers MX62-MX64 receiving the first syllables of the instruction bundles include a reduced number of inputs, and the first syllable input of the processing unit PU1 is directly connected to the register R01. It follows that the processing units PU1-PU4 receive the first syllables before the second syllables. Since the second syllables are not required for decoding the first syllables, the input circuit INC has the feature of initiating the processing of the elementary instructions of the instruction bundle, and thus activates all the processing units PU1-PU4 involved, before transmission to the processing units of the possible subsequent syllables of the elementary instructions, which may be present in registers R22-R28.

Figure 6:
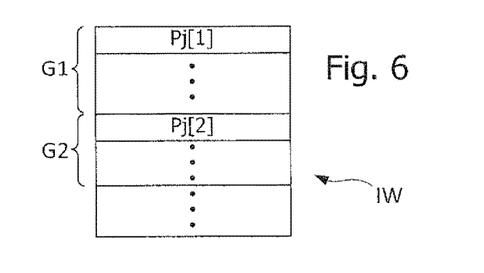
FIG. 6 schematically shows an instruction bundle, according to an embodiment.

FIG. 6 shows an instruction bundle IW. According to an embodiment, the instruction bundle includes a group G1 of syllables of first rank Pj[1] of elementary instructions Pj, possibly a group G2 of syllables of second rank Pj[2] of the elementary instructions Pj, and possibly one or more lower rank syllable groups of the elementary instructions Pj, when the elementary instructions have more than two syllables. Here j corresponds to a processing unit number of the processor, and may be 1, 2, 3 or 4 in the example of FIG. 5. The instruction bundles IW may thus have the following minimum and maximum content, respectively:

minimum: Pj[1] with j=1, 2, 3 or 4
maximum: P1[1]-P2[1]-P3[1]-P4[1]-P1[2]-P2[2]-P3[2]-P4[2]

Where Pj[1] represents the first syllable (or syllable of rank 1) of an elementary instruction Pj executable by processing unit PUj (j=1, 2, 3 or 4), and Pj[2] represents a second syllable (syllable of rank 2) of the elementary instruction Pj. All possible contents of an instruction bundle can be obtained by removing one or more syllables from the maximum content, maintaining the order of the syllables of the maximum content, assuming an instruction bundle cannot have a second syllable Pj[2] without the corresponding first syllable Pj[1].

The possible contents of registers R21-R28 are shown in Table 1 below:

TABLE 1

| | | | | | | | | |
|---|---|---|---|---|---|---|---|---|
| R21 | P1[1] | P2[1] | P3[1] | P4[1] | | | | |
| R22 | | P2[1] | P3[1] | P4[1] | P1[2] | P2[2] | P3[2] | P4[2] |
| R23 | | | P3[1] | P4[1] | P1[2] | P2[2] | P3[2] | P4[2] |
| R24 | | | | P4[1] | P1[2] | P2[2] | P3[2] | P4[2] |
| R25 | | | | | P1[2] | P2[2] | P3[2] | P4[2] |
| R26 | | | | | | P2[2] | P3[2] | P4[2] |
| R27 | | | | | | | P3[2] | P4[2] |
| R28 | | | | | | | | P4[2] |
| MUX | — | MX62 | MX63 | MX64 | MX71 | MX72 | MX73 | MX74 |

The diagonal from top left to bottom right of Table 1 is the maximum content of the instruction bundle IW. Each column of Table 1 represents one of multiplexers MX62-MX64 and MX71-MX74, indicated in the last line MUX of the table. Each column of Table 1 defines by its non-empty boxes the registers R21-R28 at the input of the corresponding multiplexer MX62-MX64 and MX71-MX74.

According to an embodiment, the order assigned to the processing units is defined according to their time criticality. For example, a branch control unit BCU may be considered the most critical in time because it needs to know as soon as possible the instruction to execute and the associated operands, in order to execute the branch quickly and thus minimize the time necessary for executing the branch operation.

Figure 7:
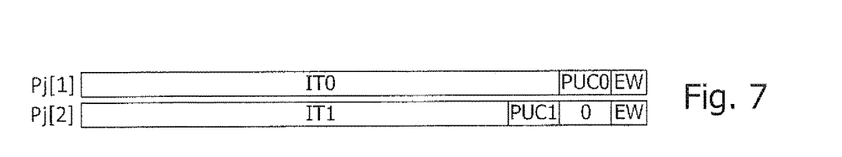
FIGS. 7 and 8 show elementary instruction structures, according to an embodiment.

According to an embodiment, each syllable includes a processing unit code specifying which processing unit it should be processed by, FIG. 7 shows syllables of first and second rank Pj[1], Pj[2] of an elementary instruction Pj. The syllable Pj[1] includes an instruction field IT0, a processing unit code field PUC0, and a field EW indicating whether the syllable is the last syllable of the VLIW instruction bundle. If the processor has multiple processing units configured to perform the same operations, it may be devised that the processing unit code PUC0 does not differentiate between the processing units in order to reduce the code length.

The syllable Pj[2] of elementary instruction Pj includes an instruction field IT1, the field EW indicating whether the syllable is the last of the VLIW instruction bundle, the processing unit code field PUC0 set to 0, and a processing unit code field PUC1 for the second syllable. The processing unit code fields PUC0, PUC1 may be used to control the multiplexers MX62-MX64 and MX71-MX74.

Figure 8:
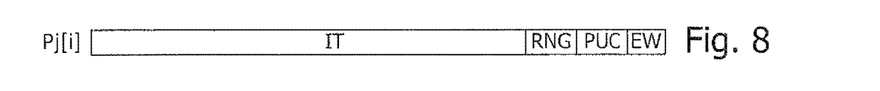

Of course, other fields may be provided in the syllables Pj[i]. Thus, FIG. 8 represents a syllable Pj[i] of rank i. The syllable Pj[1] includes an instruction field IT, a processing unit code field PUC, the EW field, and a field RNG indicating the rank i of the syllable (encoded on one bit when the elementary instructions include up to two syllables).

The transfer of all the elementary instructions from registers R21-R28 to the processing units PU1-PU4 is triggered by writing the last syllable of an instruction bundle in one of the registers (presence of an EW field indicating the last syllable of the bundle). The arrival time of a syllable in a processing unit depends on the size of the multiplexer MX62-MX64, MW71-MX74. Therefore, the units PU1-PU4 may first receive a first syllable, in the order PU1, PU2, PU3, PU4. Since the multiplexers MX71 and MX64 have a same number of inputs, they can simultaneously receive a syllable of the instruction bundle present in the registers R21-R28. The processing units PU2 to PU4 may then successively receive a syllable.

According to an embodiment, the processor includes one or more branch control units BCU, one or more arithmetic and logic units ALU, one or more load and store units LSU, and one or more fixed or floating point multiply and accumulate units MAU.

Figure 9:
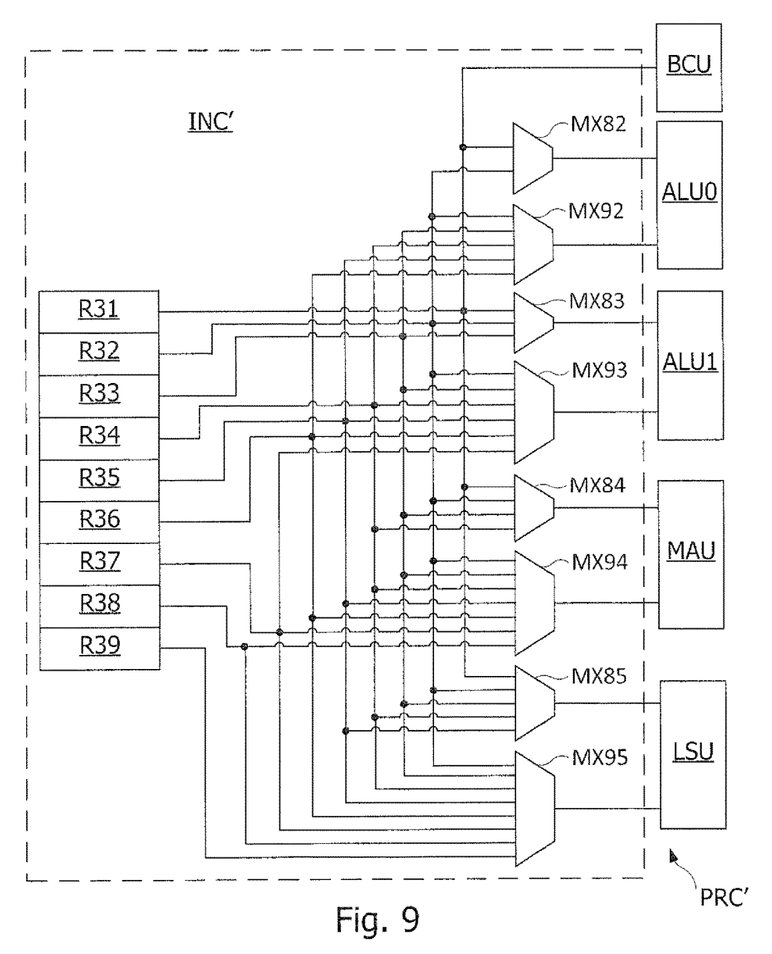
FIG. 9 schematically shows the processing units of a VLIW processor, and their input circuitry, according to another embodiment.

FIG. 9 shows an exemplary processor PRC' comprising five processing units, namely a BCU, two ALUs named ALU0 and ALU1, an MAU, and an LSU. The BCU handles only one-syllable elementary instructions, while the other processing units ALU0, ALU1, MAU and LSU can handle elementary instructions having one or two syllables. The processing units may be ordered in the order BCU, ALU, MAU and LSU. The instruction bundles may thus at most have the following nine-syllable content:

BC[1]-A0[1]-A1[1]-MA[1]-LS[1]-A0[2]-A1[2]-MA[2]-LS[2]

In which BC[1], A0[1], A1[1], MA[1] and LS[1] are first-rank syllables of elementary instructions respectively targeting the units BCU, ALU0, ALU1, MAU and LSU, and A0[2], A1[2] MA[2] and LS[2] are second-rank syllables respectively targeting the units ALU0, ALU1, MAU and LSU.

FIG. 9 shows a processor PRC' including the processing units BCU, ALU0, ALU1, MAU and LSU and an input circuit INC'. The input circuit INC' includes instruction registers R31 to R39, and multiplexers MX82-MX85 and MX92-MX94 connecting the input registers to the processing units. The registers R31-R39 each receive a respective syllable of the elementary instructions of an instruction bundle IW. FIG. 9 thus illustrates the case of a processor having five processing units, capable of processing instruction bundles IW with five elementary instructions of one or two syllables.

The possible contents of the registers R31 to R39 are shown in Table 2 below:

TABLE 2

| R31 | BC[1] | A0[1] | A1[1] | MA[1] | LS[1] | | | | |
|---|---|---|---|---|---|---|---|---|---|
| R32 | | A0[1] | A1[1] | MA[1] | LS[1] | A0[2] | A1[2] | MA[2] | LS[2] |
| R33 | | | A1[1] | MA[1] | LS[1]] | A0[2] | A1[2] | MA[2] | LS[2] |
| R34 | | | | MA[1] | LS[1] | A0[2] | A1[2] | MA[2] | LS[2] |
| R35 | | | | | LS[1]] | A0[2] | A1[2] | MA[2] | LS[2] |
| R36 | | | | | | A0[2] | A1[2] | MA[2] | LS[2] |
| R37 | | | | | | | A1[2] | MA[2] | LS[2] |
| R38 | | | | | | | | MA[2] | LS[2] |
| R39 | | | | | | | | | LS[2] |
| MUX | — | MX82 | MX83 | MX84 | MX85 | MX92 | MX93 | MX94 | MX95 |

Each column of Table 2 defines by non-empty cells the registers R31 to R39 at the input of one of the multiplexers MX82-MX85 and MX92-MX95, as identified in the last line MUX of the table.

The register R31 is connected directly to the single input of the processing unit BCU. The multiplexer MX82 is connected by its inputs to the registers R31 and R32, and by its output to the first input of the processing unit ALU0. The multiplexer MX92 is connected by its inputs to the registers R32-R36, and by its output to the second input of the processing unit ALU0. The multiplexer MX83 is connected by its inputs to the registers R31-R33, and by its output to the first input of the processing unit ALU1. The multiplexer MX93 is connected by its inputs to the registers R32-R37, and by its output to the second input of the processing unit ALU1. The multiplexer MX84 is connected by its inputs to the registers R31-R34, and by its output to the first input of the processing unit MAU. The multiplexer MX94 is connected by its inputs to the registers R32-R38, and by its output to the second input of the processing unit MAU. The multiplexer MX85 is connected by its inputs to the registers R31-R35, and by its output to the first input of the processing unit LSU. The multiplexer MX95 is connected by its inputs to the registers R32-R39, and by its output to the second input of the processing unit LSU. The multiplexers MX82-MX85 and MX92-MX95 have a total of 40 entries.

Since the input of the BCU unit is directly connected to the register R31, the processing of the branch instructions may start first. Due to the number of multiplexer inputs to which they are connected, the processing units ALU0, ALU1, MAU and LSU may then successively receive a first syllable. The ALU0 unit can receive a second syllable while the LSU receives a first syllable. The units ALU1, MAU and LSU may then successively receive a second syllable.

According to an embodiment, the compiler generates instruction bundles IW having eight syllables at most. As a result, the register R39 may be omitted and the multiplexer MX95 has only seven inputs instead of eight. Thus, the multiplexers of the input circuit INC' have 3 control bits at most. This arrangement also reduces the propagation time of a second syllable to the LSU processing unit. This simplification of the input circuit INC' has negligible side effects because the probability for the compiler to generate an instruction bundle IW with nine syllables is low.

Since the processor has two similar processing units ALU0, ALU1, the PUC0 field need not differentiate these two processing units, whereby this field may be encoded with only 2 bits for four types of processing units. If an instruction bundle includes an elementary instruction for one of the ALU units, it will be forwarded to the unit ALU0. The unit ALU1 will be activated only if the instruction bundle IW includes two elementary instructions to be processed by an ALU. Since the BCU unit receives no second syllable, only the four processing units ALU0, ALU1, MAU, LSU are likely to receive a second syllable. The PUC1 field may therefore also include only 2 bits. In case the syllables contain PUC and RNG fields, only 4 bits are needed to encode a processing unit number (3 bits for five processing units) and the rank of the syllable (1 bit for one or two-syllable elementary instructions).

It will be apparent to those skilled in the art that the present invention is susceptible to various alternatives and applications. In particular, the invention is not limited to instruction bundles in which syllables are grouped by rank and ordered according to ranks assigned to the processing units. It is sufficient that the transfer of syllables to the processing units is performed starting with the first rank of the syllables. Placing the syllables of first rank at the start of the instruction bundles merely allows transmitting in first place to the processing units, the syllables of first rank located in the input registers.

Moreover, it is not necessary that each syllable of each instruction bundle includes an end code indicating whether the syllable is the last in the instruction bundle. Indeed, it can be devised that each instruction bundle includes, for example, a header or tail field specifying the number of syllables in the instruction bundle. The fields PUC0, PUC1 specifying a processing unit to which a syllable is to be transmitted and the rank RNG of each syllable, or an input number of a processing unit to which each syllable is to be transmitted, can also be inserted in such a header or tail field of an instruction bundle.

The invention claimed is:

1. A method of compiling a program for a processor having multiple processing units capable of executing instruction bundles having several elementary instructions, the method comprising steps of:
   gathering in an instruction bundle multiple elementary instructions each targeting a respective processing unit of the processor, each elementary instruction including one or more syllables each having a rank in the elementary instruction, and
   distributing the syllables of the elementary instructions in the instruction bundle by groups of syllables of same rank, a group of syllables of first rank of all elementary instructions of the instruction bundle being inserted in the instruction bundle before a group of syllables of second rank of all the elementary instructions of the instruction bundle, the syllables in each group being ordered according to the target processing unit of each syllable.

2. The method of claim 1, wherein the syllables of same rank are ordered in the instruction bundle so that a high priority processing unit receives first its respective elementary instruction syllable.

3. The method of claim 1, wherein each syllable of each instruction bundle includes an end code indicating whether the syllable is the last in the instruction bundle.

4. The method according to claim 1, wherein each syllable of each instruction bundle includes a processing unit code indicating the processing unit to which the syllable is to be transmitted.

5. The method according to claim 1, wherein each syllable of each instruction bundle includes a code indicating the rank of the syllable.

6. The method according to claim 1, wherein each instruction bundle includes less syllables than the number of processing units times the maximum number of syllables per elementary instruction.

7. The method according to claim 1, wherein the syllables of all elementary instructions have the same length.

8. A processor comprising:
   multiple processing units for processing multiple elementary instructions in parallel, the elementary instructions including one or more syllables, each having a rank in the elementary instruction, and
   an input circuit configured to receive an instruction bundle including multiple elementary instructions, and to transmit to the processing units all syllables of first rank of the elementary instructions of the instruction bundle faster than syllables of second rank of the elementary instructions of the instruction bundle, the syllables of same rank being ordered according to the target processing unit of each syllable.

9. The processor of claim 8, wherein the syllables of the instruction bundle are distributed in groups of syllables of same rank, a group of syllables of first rank being placed at the beginning of the instruction bundle, wherein the syllables in each group are ordered in an order assigned to the processing units.

10. The processor according to claim 8, wherein the input circuit is configured to transmit to the processing units the syllables of each group of the instruction bundle, respecting the order assigned to the processing units.

11. The processor according to claim 8, wherein the input circuit includes registers configured for receiving each a respective syllable of the instruction bundle, the number of registers being at most equal to the number of processing units of the processor, times a maximum number of syllables per elementary instruction.

12. The processor according to claim 8, wherein the number of registers is less than the number of processing units of the processor, times a maximum number of syllables per elementary instruction.

13. The processor according to claim 8, wherein each syllable of each instruction bundle includes an end code indicating whether the syllable is the last in the instruction bundle.

14. The processor according to claim 8, wherein each syllable of each instruction bundle includes a processing unit code indicating the processing unit to which the syllable is to be transmitted.

15. The processor according to claim 8, wherein each syllable of each instruction bundle includes a code indicating the rank of the syllable.

* * * * *